United States Patent [19]
Bradstreet

[11] 3,796,188
[45] Mar. 12, 1974

[54] REUSABLE SANITARY PET LAVATORY

[76] Inventor: Samuel R. Bradstreet, 849 F St., Lake Oswego, Oreg. 48236

[22] Filed: Oct. 12, 1972

[21] Appl. No.: 296,758

[52] U.S. Cl. .................................. 119/1, 209/355
[51] Int. Cl. .................................. A01k 29/00
[58] Field of Search .......... 119/1, 19; 209/355, 373, 209/374

[56] References Cited
UNITED STATES PATENTS

| | | |
|---|---|---|
| 3,141,441 | 7/1964 | Russell .................................. 119/1 |
| 2,963,003 | 12/1960 | Oberg et al. ............................ 119/1 |
| 3,100,474 | 8/1963 | Schneider ............................... 119/1 |
| 3,687,330 | 8/1972 | Herolzer ............................ 119/19 X |

Primary Examiner—Louis G. Mancene
Assistant Examiner—J. N. Eskovitz
Attorney, Agent, or Firm—Daniel P. Chernoff; Jacob E. Vilhauer, Jr.

[57] ABSTRACT

A reusable, sanitary pet lavatory comprises a pair of identical nested box-like receptacles with each of the receptacles having a screened or perforated plate positioned above a slideable floor member. In use, the upper receptacle, which contains pet litter, nests within and is supported by the lower receptacle; the floor members located in each receptacle being in a closed position with respect to the perforated plate. The closed floor member in the upper receptacle prevents the pet litter, in which pet excrement is deposited, from falling into the lower receptacle until separation of the excrement from the litter is desired. The apertures perforated in the plate member are sized to screen out the solid pet excrement while permitting the separated pet litter to pass through to the lower receptacle for collection when the slide in the upper receptacle is opened. The components are interchangeable so that each receptacle can serve as either the separating or collecting means for the lavatory.

4 Claims, 2 Drawing Figures

PATENTED MAR 12 1974  3,796,188

REUSABLE SANITARY PET LAVATORY

BACKGROUND OF THE INVENTION

This invention relates to a reusable sanitary pet lavatory for indoor use. Indoor collection of solid pet excrement is readily accomplished by employing a receptacle containing various types of commercially available pet litter which are absorbent, deodorizing and reusable. However, unless the feces is removed on a regular basis, the litter will lose its absorbent and deodorizing characteristics and, in addition, will decay and not be reusable.

Various types of pet lavatories are known to the art for removing the solid excrement deposited in the pet litter. U.S. Pat. No. 3,100,474 to Schneider and U.S. Pat. No. 3,141,441 to Russell provide a housing containing three separate sections: an upper imperforate plate, and intermediate screen, and a lower collecting means. However, in both of these patents it is required that the litter be transferred into the upper receptacle portion after screening which may result in spillage of the litter. The Schneider patent also provides a single rectangular-walled housing which, because of its configuration, may cause difficulty in removing litter accidentally trapped within the housing confines. The Russell patent requires the additional step of removing an imperforate plate from the housing and replacing it therein after the waste material is separated. Other known devices, such as shown in U.S. Pat. No. 2,963,003 to Oberg et al, U.S. Pat. No. 3,233,588 to Thomas, and U.S. Pat. No. 3,332,397 to Vander Wall, provide independent sieves or separaters not connected to the receptacle to remove the waste material contained in the litter. However, an additional transference of litter between receptacles is required by Oberg, an inversion of the entire disposal device is required by Thomas, while Vander Wall employs a scoop-like sieve which is both time consuming in its operation and does not readily remove all the solid excrement accumulated in the litter.

Accordingly, a need exists for an improved pet lavatory for indoor use which acts as an efficient and neat separating and collecting means for the litter and fecal matter.

SUMMARY OF THE INVENTION

The present invention is directed to a novel and improved reusable sanitary pet lavatory of the general type described which comprises a pair of interchangeable, identically constructed nested box-like receptacles each including a screened or perforated plate member and an imperforate slideable floor member. The upper receptacle contains pet litter into which the pet excrement is deposited and, when the system is in use, the floor member, which is in the closed position with respect to the perforated plate member, acts to retain the pet litter within the confines of the upper receptacle. Separation of the excrement is accomplished automatically by moving the slideable floor to an open positon with respect to the perforated plate member whose apertures are sized to retain the pet excrement thereon while allowing only the finer-sized pet litter to pass through into the lower receptacle. The floor member of the upper unit is then returned to a closed position, the excrement removed from the plate member and discarded, and the receptacles interchanged and nestably engaged so that the positions of the upper and lower receptacles are reversed. The lavatory is then ready for reuse.

The novel constructional features of the reusable sanitary pet lavatory provides it with a number of important operational features. First, the receptacles are interchangeable and nestable so that automatic separation of the excrement and litter phases is accomplished in a neat and expedient manner by merely moving the floor member of the upper receptacle to an open positions. This permits the effective one-step transference of substantially excrement-free litter to the lower collecting receptacle for ready reuse.

Secondly, the use of identical upper and lower receptacles permits the use of standardized components in the system, thereby reducing the cost of manufacture.

It is therefore a principal feature of the present invention to provide a new and improved pet lavatory which comprises a pair of interchangeable, nestable, substantially identical box-like receptacles, each receptacle including a perforated plate member and slideable imperforate floor member.

It is a principal object of the present invention to provide a reusable pet lavatory which is economical to manufacture, easy to operate, and requires only a single transference step both for separating out the pet waste and for conveying the waste-free litter to a second receptacle ready for reuse.

The foregoing objects, features and advantages of the present invention will be more readily understood upon consideration of the following detailed description of the invention taken in conjunction with the accompanying drawings.

DESCRIPTION OF THE PREFERRED EMBODIMENT

Figures 1, 2:
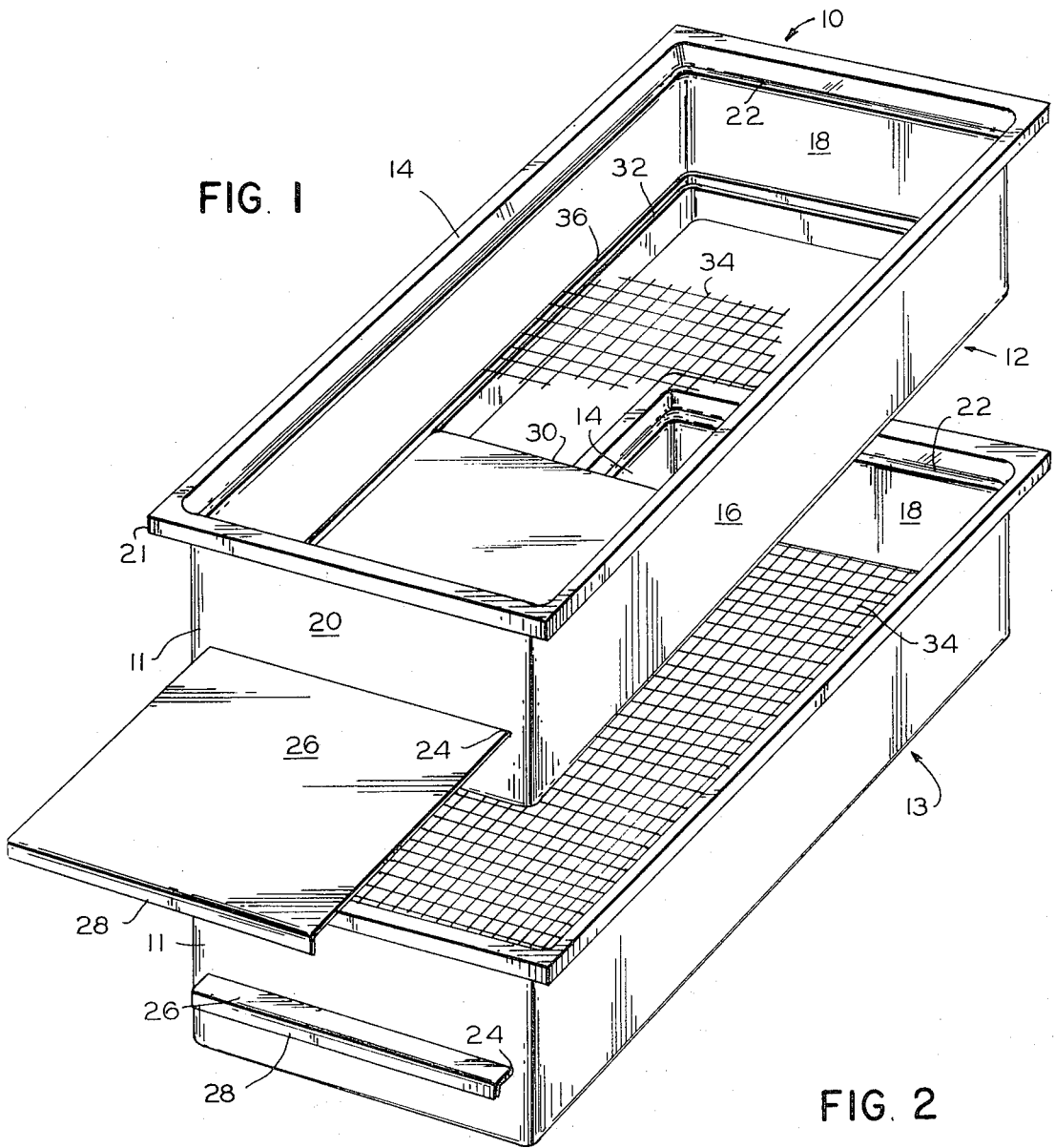
FIG. 1 is an exploded perspective view of the pet lavatory of the present invention.
FIG. 2 is a transverse sectional view taken through the center of the pet lavatory of FIG. 1 with its component parts in assembled relationship.

Referring to FIGS. 1 and 2, a reusable sanitary pet lavatory designated generally as 10, comprises a pair of identical interchangeable box-like receptacles 12 and 13 which are preferably rectangular in configuration, each receptacle having a peripheral frame 11 formed of a pair of side walls 14 and 16, a rear wall 18, and a front wall 20 containing a slot 24. Extending from the outer ends of slot 24, and around the inner periphery of walls 14, 16 and 18, is a support channel 32. Immediately thereabove and extending within the entire inner periphery of the receptacle is a second support channel 36. The top edge of the receptacle includes a lip 21 which provides both a firm footing for the pet when entering or exiting the lavatory and may also be used as a handling grip for changing the respective positions of the upper and lower receptacles. Positioned between lip 21 and channel 36, and extending around the inner periphery of the receptacle, is a recessed ledge 22 which acts to support the upper of the two nested receptacles during use of the device as a lavatory.

An imperforate floor member 26 is mounted within slot 24 for slideable movement in a horizontal plane with respect to the peripheral frame; a close tolerance existing between the respective floor and slot. Floor 26 has a handle member 28 attached at the front end and a stop 30 attached at the rear end, the latter for preventing the plate from being disengaged from the receptacle during movement of the floor between open and closed positions.

The plate member 34, in the form of a screen containing a plurality of apertures, is secured within slot 36 and supports thereon, in conjunction with floor member 26, a layer of pet litter 38. The apertures in the floor member are relatively large enough, with respect to the pet litter, so that the litter will quickly flow through the perforated openings, but small enought to prevent passage of the pet feces into the lower receptacle. The perforated floor member preferably constucted of wire mesh or other suitable perforated material. Preferably, the respective upper and lower receptacles are of identical configuration and, for purposes of durability and cost, the walls and plate member are constructed of an inexpensive synthetic polymer or other non-corroding impact-resistant material.

In operation as a reusable pet lavatory, a pair of receptacles 12 and 13, respectively, are nestably engaged one within the other so that the bottom edge of the upper receptacle 12 is supported on the recess ledge 22 of the lower receptacle 13 and spaced above the floor member 26 of the lower receptacle. A layer of pet litter, such as vermiculite or other fine sized absorbent material, is provided in the upper receptacle of sufficient depth of thickness to extend above the level of the plate member 34. After the pet has deposited a sufficient amount of solid pet excrement on the litter to require removal, the floor member is moved to an open position with respect to the plate member so that the apertures therein are completely exposed. This is accomplished by pulling on handle member 28 until stop 30, which is larger in size than slot 24, contacts the inner portion of front wall 20. As the floor is opened the litter falls through the screen and into the lower receptacle while the solid excrement remains on the plate. The floor member of the upper receptacle is positioned so that it can be slideably opened or closed without moving either of the receptacles once they are nestably engaged. After all the litter is collected in lower receptacle 13, floor member 26 is returned to a closed position, the upper receptacle is lifted off the lower receptacle, and the solid excrement is removed from the plate with a suitable scooping means and discarded. The lavatory 10 is then reassembled and made ready for reuse by nestably fitting the receptacles together so that the positions of the receptacles are reversed with the previous lower unit which now contains the screened litter used as the upper unit.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A reusable sanitary pet lavatory which comprises a pair of vertically stacked, substantially identical, interchangeable, upper and lower receptacles, each of said receptacles comprising a peripheral frame, a plate member within said receptacle frame containing a plurality of apertures, and a floor member mounted beneath said plate member and movable with respect thereto for respectively exposing and closing off said apertures in said plate member.

2. The pet lavatory of claim 1 further characterized in that said peripheral frame is substantially rectangular and comprises a front wall, a rear wall, and a pair of side walls; and said floor member is mounted within a slot in said front wall for slideable movement in a horizontal direction with respect to said peripheral frame.

3. The pet lavatory of claim 2 wherein each receptacle further comprises a recessed ledge extending along the inner periphery of the top edge of said peripheral frame for supporting another of said receptacles nested therein with the bottom edge of the supported receptacle resting on said ledge and spaced above said plate member of the lower receptacle; and channel means extending from the ends of said slot along the inner periphery of said side and rear walls for supporting said slideable floor member therein.

4. The pet lavatory of claim 3 wherein said floor member further comprises a stop attached to the rear end of said floor member for preventing disengagement of said floor from said slot when said floor member is moved to a completely opened position with respect to said plate member.

* * * * *